United States Patent
Charoudi

[11] 3,953,110
[45] Apr. 27, 1976

[54] TRANSPARENT THERMAL INSULATING SYSTEM

[76] Inventor: Day Charoudi, 5A Newton Place, Somerville, Mass. 02143

[22] Filed: May 20, 1974

[21] Appl. No.: 471,767

[52] U.S. Cl. ............................. 350/161; 428/188; 428/212; 237/1 A; 237/2 A; 350/160 R; 428/34; 428/38
[51] Int. Cl.² .................... B32B 7/00; F24J 3/02; G02F 1/19
[58] Field of Search ............... 161/1, 3.5, 4, 6, 68, 161/69, 139, 408; 237/1 A, 2 A; 350/160 R

[56] References Cited
UNITED STATES PATENTS

| | | | |
|---|---|---|---|
| 1,875,188 | 8/1932 | Williams | 161/68 UX |
| 3,459,391 | 8/1969 | Haynos | 161/68 |
| 3,775,226 | 11/1973 | Windorf | 161/1 X |

*Primary Examiner*—Mayer Weinblatt
*Attorney, Agent, or Firm*—Joseph S. Iandiorio

[57] ABSTRACT

A transparent thermal insulating system having controllable transmissivity to visible radiation comprising a first layer generally transparent to visible radiation, a second layer generally transparent to visible radiation and spaced from the first layer; partition means for separating the space between the layers into compartments; a thermal radiation suppression device for suppressing thermal radiation transmission; and a variable transparency thermal control device for controlling transmission of visible radiation as a function of temperature.

16 Claims, 8 Drawing Figures

TRANSPARENT THERMAL INSULATING SYSTEM

FIELD OF INVENTION

This invention relates to an improved transparent thermal insulating member which prevents heat loss by thermal radiation, convection and conduction and to a transparent thermal insulating system including such a transparent insulating member having controllable transmissivity to visible radiation.

BACKGROUND OF INVENTION

Conventional collectors of solar heat include a dark absorber surface that turns sunlight into heat and a transparent cover for this surface to prevent the heat from escaping. The thermal collection efficiency of such a system is determined by the ratio of the resistance to the flow of heat of the transparent cover to the resistance of the rest of the system. By increasing the thermal resistance of the transparent cover without greatly reducing its light transmission, the efficiency and/or operating temperature of any solar heat collector can be greatly improved. It is estimated that two or three times the energy consumed in heating a well insulated building falls on its surface in the form of sunlight. Thus, an insulation that is transparent when the sun shines would provide most of the heating for a structure over most of the United States if it is coupled with a heat storage system for cloudy weather.

In the past the problems of heat loss through conduction, convection and thermal radiation and control of sunlight have been dealt with independently: convection and conduction losses are reduced using spaces filled with some fine structural material without consideration of admission of sunlight; sunlight has been blocked using coatings or layers on windows to prevent room overheating but without consideration of a technique for admitting more sunlight when it is desired to increase the heat in the room. Thermal radiation loss has been of little concern since in the latter situation heat loss is desirable and in the former it is not considered.

Since the heat losses by conduction, convection and radiation are in parallel to each other and are of similar magnitudes, an insulation is ineffective unless all three are dealt with simultaneously, as heat will leave by the path of least resistance.

SUMMARY OF INVENTION

It is therefore an object of this invention to provide an improved transparent insulating member which simultaneously, substantially reduces heat loss by thermal radiation, convection and conduction.

It is a further object of this invention to provide a transparent insulating system including such an insulating member and having controllable transmissivity to visible radiation.

It is a further object of this invention to provide a simple inexpensive transparent insulating system for improving the efficiency of collectors for solar space cooling, water heating and reducing heat losses through windows as well as improving the efficiency of solar space heating systems.

The invention features a transparent thermal insulating system having controllable transmissivity to visible radiation including a first layer generally transparent to visible radiation and a second layer transparent to visible radiation and spaced from the first layer. There is a partition separating the space between the layers into compartments and reducing convection losses. There is a thermal radiation suppression device for suppressing thermal radiation transmission and a variably transparent thermal control device which controls transmission of visible radiation as a function of temperature.

DISCLOSURE OF PREFERRED EMBODIMENT

Other objects, features and advantages will occur from the following description of a preferred embodiment and the accompanying drawings, in which.

Figure 1:
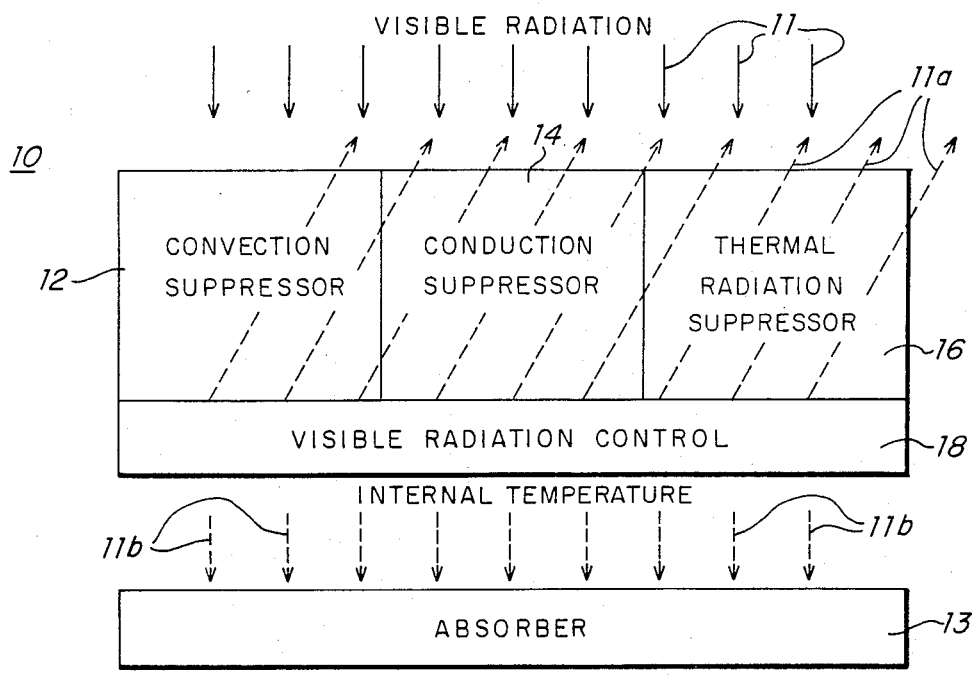
FIG. 1 is a block diagram showing the functional components of the transparent thermal insulating system according to this invention.

There is shown in FIG. 1 a functional block diagram of a transparent thermal insulating system 10 having controllable transmissivity to visible radiation. Insulating system 10 includes means for suppressing convection, conduction and thermal radiation heat losses; convection suppressor 12, conduction suppressor 14, and thermal radiation suppressor 16. Each of the suppressors 12, 14 and 16 of thermal transport mechanisms extend over the whole system but are shown distinctly for convenience in explanation. Actually they are superimposed. Visible radiation control 18 adjusts the transmissivity of system 10 to visible radiation in accordance with the temperature of the area whose environment is to be controlled.

Conduction suppressor 14 may be provided through the use of two or more spaced layers with a gas, vacuum or other medium between them to prevent conduction.

Convection suppressor 12 may include compartmentalizing the space between the layers or providing therein a vacuum. The compartmentalizing may be accomplished by baffles or partitions which extend transversely between the layers and/or parallel to the layers to restrict convective heat transport.

Thermal radiation suppressor 16 may include a coating or layer of material which either reflects thermal radiation to prevent its transmission or absorbs and re-emits thermal radiation one or more times reducing the intensity of the thermal radiation with each absorption and re-emission.

Visible radiation control 18 may include a pressurizing system responsive to a thermostatic element for varying the pressure in the compartments to increase or decrease the transmission of visible radiation. Alternatively such control may be accomplished with a variable transmission layer including a material which becomes cloudy and opaque white to visible radiation above a certain temperature and remains clear to transmit visible radiation below that temperature.

In operation visible radiation, arrows 11, e.g., sunlight incident on system 10 is either reflected, arrows 11a, by variable transmission layer 18 in the opaque condition or transmitted, arrows 11b, by variable transmission layer 18 in the transparent condition. Transmitted radiation 11b strikes bodies, absorber 13, within the internal environment causing the temperature of absorber 13 to rise.

Figure 2:
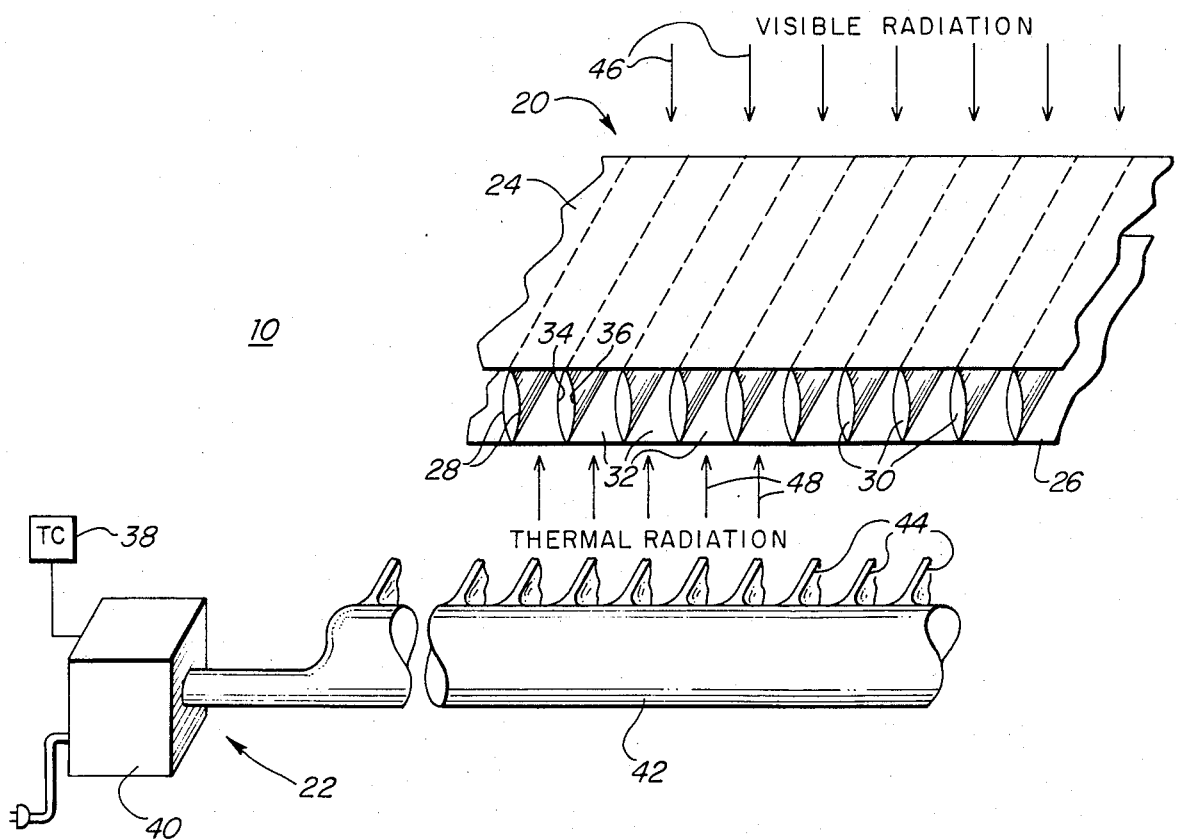
FIG. 2 is a schematic diagram showing portions of a transparent thermal insulating system according to this invention with the insulating member adjusted to transmit visible radiation.

In one specific embodiment, FIG. 2, the system 10 includes a transparent insulating member 20 and a pressurizing system 22. Insulating member 20 includes an outer layer 24 which may be formed with a plasticized vinyl with an ultraviolet absorber having a thickness of 16 mils and an inner layer 26 of similar 6 mil vinyl. Tubular webbing 28 extends transversely between layers 24 and 26 to form a first set of compartments 30 and a second set of interstitial compartments 32. Webbing 28 is formed of Mylar with aluminized inner surfaces 34 and 36. Pressurizing unit 22 includes a thermostatic control 38, a vacuum or pressure pump 40 and a manifold 42 whose outputs 44 interconnect with compartments 30 or 32 or both.

As shown in FIG. 2, insulating member 20 provides good insulation against convection and conduction losses and permits good transmission of visible radiation, arrows 46, through compartments 32 because of parallel mirrors 34 and 36. In this condition there is some loss of thermal radiation 48 through the same compartments 32 which is tolerable in view of the heat which will be generated by the visible radiation which is transmitted by insulating member 20.

Figure 3:
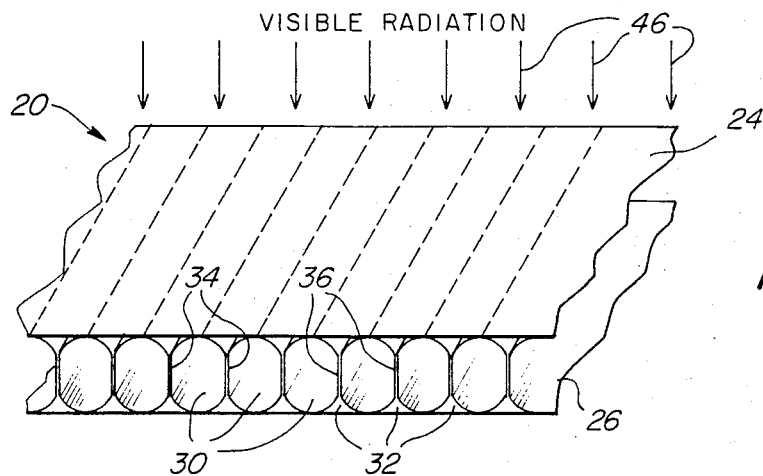
FIG. 3 is a schematic diagram of the insulating member of FIG. 2 adjusted to block visible radiation.

Insulating member 20 may be made to block further transmission of visible radiation 46 and further heat losses due to transmission of thermal radiation 48 by increasing the pressure in compartments 30 relative to the pressure in compartments 32 so that insulating member 20 assumes the configuration shown in FIG. 3 wherein the tubular webbing 28 of each of compartments 30 has expanded to contact the tubular webbing 28 of the adjacent compartments 30. In this configuration visible radiation 46 will be reflected by the aluminized surfaces 34 and 36 of compartments 30, e.g. 1000 A. of aluminum which provide low emissivity surfaces to minimize thermal transport by radiation.

If substantial cooling is desired both compartments 30 and 32 can be completely deflated so that there is good conduction between layers 24 and 26 through the collapsed webbings 28 of compartments 30 and 32 while the aluminized surfaces 34 and 36 maintain their opacity to visible radiation.

Figure 4:
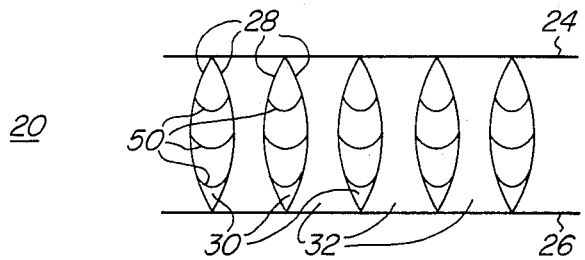
FIG. 4 is a schematic diagram of a portion of an alternatively constructed insulating member similar to that shown in FIG. 2 adjusted to transmit visible radiation.
Figure 5:
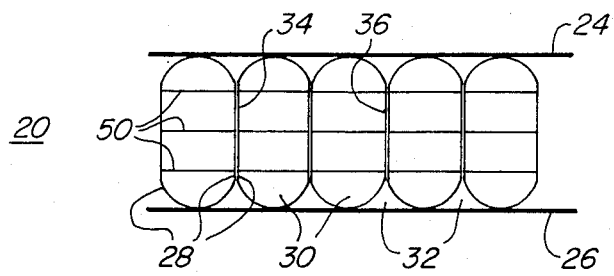
FIG. 5 is a schematic diagram of the insulating member of FIG. 4 adjusted to block visible radiation.

The suppression of convection and radiative heat losses can be further increased in insulating member 20 by providing one or more inner webs 50, FIG. 4, extending transversely between each pair of tubular webbings 28 to further reduce the size of the areas in which convection can take place. The inner webbings 50 may be formed of 1 mil Mylar which is aluminized on both surfaces to further reduce thermal radiation losses. When fully inflated, FIG. 5, inner webbings 50 extend between tubular webbing 28 parallel to layers 24 and 26.

In operation, assuming system 10, FIG. 2, is in the heating mode, insulating member 20 will assume a configuration similar to that shown in FIG. 2 with compartments 30 at least partially deflated so that visible radiation may be transmitted through compartments 32 of insulating member 20 to heat the interior of the enclosure. As the interior absorbs the heat from visible radiation 46, the temperature rises until at a predetermined level thermostatic control 38 actuates pumps 40 to increase the pressure in compartments 30 relative to that in compartments 32 to expand compartments 30 and obstruct or block at least a portion of the visible radiation 46. As the temperature continues to increase, the thermostatic control 38 will increase the pressure and therefore the expansion of compartments until eventually insulating member 20 will appear as shown in FIG. 3, where visible radiation is entirely blocked from entering the interior and thermal radiation from the interior is prevented from leaving so that the temperature in the interior remains stable.

Figure 6:
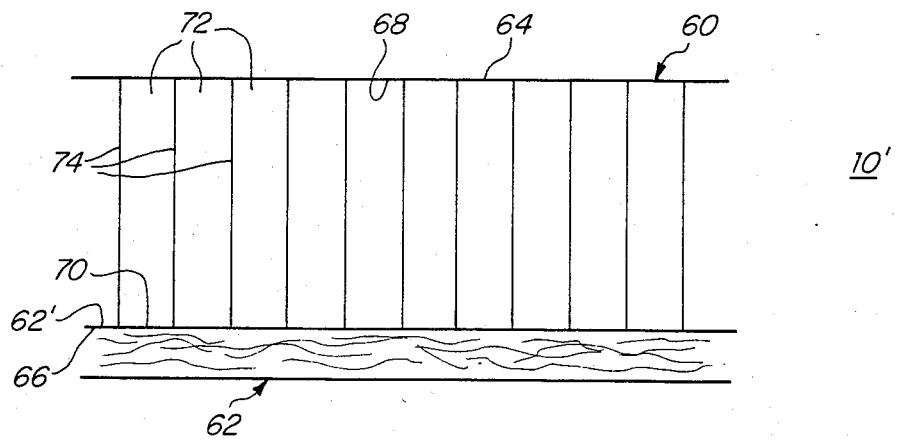
FIG. 6 is a schematic diagram of a portion of an alternative form of insulating member according to this invention and a thermally controlled variable transmission layer.

An alternative transparent thermal insulating system 10', FIG. 6, according to this invention includes insulating member 60 and variable transmission layer 62. Insulating member 60 includes outer layer 64 and inner layer 66 one or both of whose inner surfaces 68 and 70, respectively, are coated with a selective material transparent to visible radiation and reflective of thermal radiation. Outer layer 64 and inner layer 66 may be formed of glass or plastic. The space between layers 64 and 66 is formed into compartments 72 by Mylar walls 74 which are aluminized on both sides to form cylinders with reflective sides and transparent ends with respect to visible radiation and sunlight and with respect to thermal radiation to provide reflection on all inside surfaces so that the thermal transport due to thermal radiation is low.

In most conventional insulations, infa-red heat losses are prevented by using an infra-red opaque material and by giving the material a very fine structure so that radiation must be emitted and absorbed many times before it can escape. The use of a material which is transparent to visible light yet reflective to infra-red, however, enables the use of a coarse convection baffle without excessive infra-red losses.

These materials can be vacuum evaporated or chemically deposited. They are all characterized by a loss of carrier mobility at frequencies above the near infra-red. The most common examples are silver, copper, gold, gadolinum, tin oxide, indium oxide, cupric sulfide, and sodium tungstanate bronze. The transmission of these films to visible light can be increased by the use of anti-reflection coatings such as magnesium fluoride.

Variable transmission layer 62 includes a material that is transparent to visible radiation below a certain transition temperature and opaque above it, such as polyvinylmethylether which is soluble in water below a transition temperature and insoluble above it. Above the transition temperature it precipitates as a white colloid which is fine enough, in a layer only 0.01 inches thick, to reflect most of the visible radiation. Transition temperature can be varied by varying the concentration of the polyvinylmethylether or coupling it with agents such as alcohol or salting it out with inorganic salts, acids or bases. To prevent settling out and to maintain a constant thickness it can be incorporated into a gel matrix by crosslinking or applied as an emulsion in a paint.

Alternatively variable transmission layer 62 may include a waxy polymer such as $(C_2F_3Cl)_x$ emulsified in clear silicone rubber. The refractive index of visible light of the cured rubber and the wax match when the wax is solid and therefore the transmission of visible radiation by the emulsion is very high. However, when the wax melts its volume increases considerably and its refractive index decreases. Then the emulsion has a low transmission of visible radiation because the sunlight is scattered at each wax-silicone interface and the fine dispersion of the wax creates many such interfaces so that the visible radiation is essentially blocked. The transition temperature of the material is determined by the melting point of the wax. This material has the advantage that it is not subject to degradation by ultraviolet light, ozone or microorganisms.

Alternatively, instead of a variable transmission layer a pressure control layer 62', FIG. 6, may be used including a small quantity of wax in which freon is soluble. When the temperature is above the melting point of the wax, it absorbs the freon and deflates the insulation, thus maintaining the inside temperature at the melting point of the wax.

Figure 7:
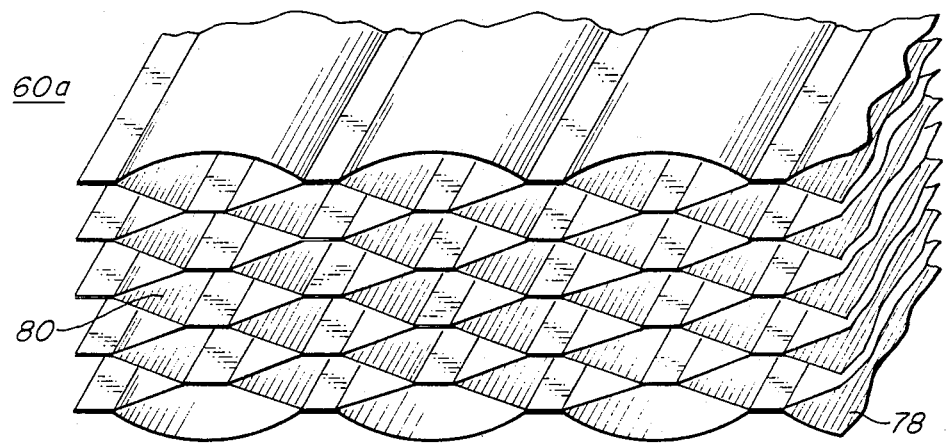
FIG. 7 is a schematic diagram of a portion of an alternative form of an insulating member.

An alternative insulating member 60a, FIG. 7, similar to insulating member 60, FIG. 6 is fabricated from flexible transparent plastic sheets 78 or can be extruded from rigid or flexible plastic. The sheets 78 may have a fluorocarbon plastic or perfluorpolyether wax anti-reflection coating on both sides. Although there are a number of sheets 78 the transmission of sunlight is still high due to the anti-reflection coating. The thermal conductivity may be controlled by the inflation of the compartments 80. Sheets 78 reflect and/or absorb and re-emit thermal radiation but do not transmit it. The plurality of sheets 78 form an effective baffle for convection as well as radiation.

Figure 8:
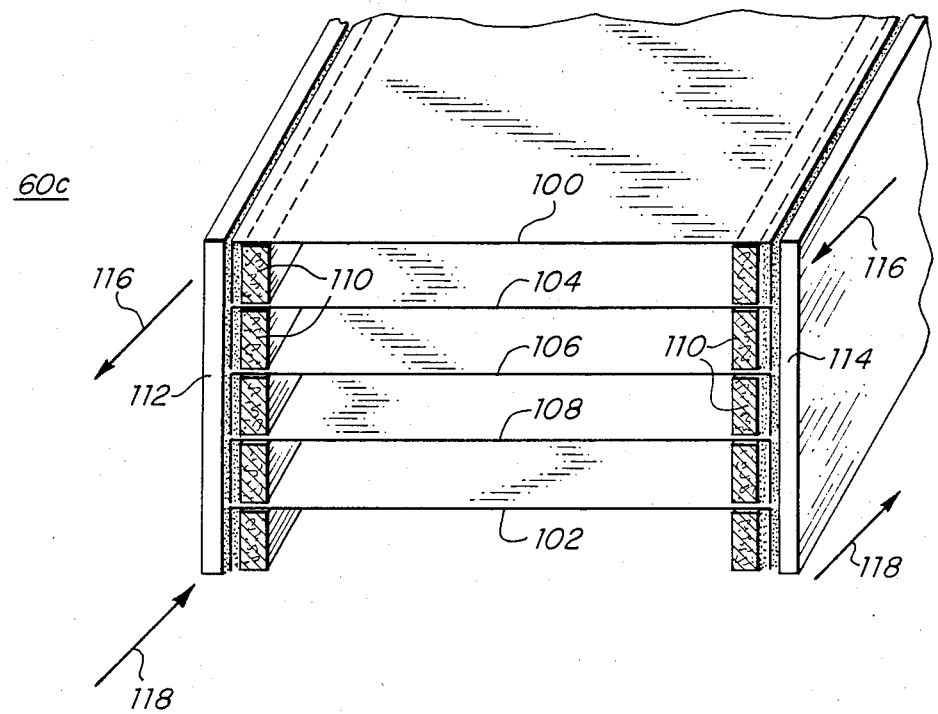
FIG. 8 is a schematic diagram of a portion of yet another insulating member.

Still another configuration of insulating member 60c, FIG. 8, includes an outer layer 100, inner layer 102, and interstitial layers 104, 106 and 108 whose ends extend around plastic strips 110 and terminate between strips 110 and sidewalls 112, 114 where the layers are secured using adhesive cement or other securing means. Sidewalls 112 and 114 and strips 110 are fiberglass or plastic material. Insulating member 60c may be collapsed by applying a force in the direction of arrows 116 and 118 to collapse and flatten the structure.

Other embodiments will occur to thse skilled in the art and are within the following claims:

What is claimed is:

1. A transparent thermal insulating system having controllable transmissivity to visible radiation comprising:
    a first layer transparent to visible radiation;
    a second layer transparent to visible radiation and spaced from said first layer;
    partition means for separating the space between said layers into compartments;
    a thermal radiation suppressor device for suppressing thermal radiation transmission; and
    a variable transparency thermal control device for controlling transmission of visible radiation as a function of temperature.

2. The system of claim 1 in which said partitions form two sets of compartments, the compartments in one of said sets having on their inner surface a coating which reflects visible and thermal radiation.

3. The system of claim 2 in which said variable transparency thermal control device includes a pressurizing mechanism for adjusting the differential pressure between said sets of compartments in response to variations of temperature for expanding the coated set to decrease transmission of visible radiation and expanding the other set to increase transmission of visible radiation.

4. The system of claim 1 in which said thermal radiation suppression device includes a coating for transmitting visible radiation and reflecting thermal radiation.

5. The system of claim 1 in which said thermal radiation suppression device includes at least one thermal radiation suppressor coating for absorbing and re-emitting thermal radiation and transmitting visible radiation.

6. The system of claim 1 in which said variable transparency thermal control device includes a variable transmission layer whose opacity to visible radiation varies as a function of temperature.

7. The system of claim 1 in which said compartments include baffles for suppressing convection currents.

8. The system of claim 2 in which said compartments are evacuated.

9. The system of claim 2 in which said compartments contain a fluid insulating medium.

10. A transparent thermal insulating system having controllable transmissivity to visible radiation comprising:
    a first layer transparent to visible radiation;
    a second layer transparent to visible radiation and spaced from said first layer;
    partition means for separating the space between said layers into compartments;
    a thermal radiation suppressor coating for transmitting visible radiation and reflecting thermal radiation; and
    a variable transparency thermal control device for controlling transmission of visible radiation as a function of temperature.

11. A transparent thermal insulating system having controllable transmissivity to visible radiation comprising:
    a first layer transparent to visible radiation;
    a second layer transparent to visible radiation and spaced from said first layer;
    partition means for separating the space between said layers into compartments, said compartments including a first and second set of interstitially arranged compartments;
    a thermal radiation suppressor device for suppressing thermal radiation transmission including a coating for reflecting visible and thermal radiation disposed on the inner surfaces of one of said sets of compartments; and
    a variable transparency thermal control device for controlling transmission through said member of visible radiation as a function of temperature including a pressurizing mechanism for adjusting the differential pressure between said sets of compartments in response to variations in temperature for expanding the coating set to decrease transmission of visible radiation and expanding the other set to increase transmission of visible radiation.

12. A transparent thermal insulating system having controllable transmissivity to visible radiation comprising:
    a first layer transparent to visible radiation;
    a second layer transparent to visible radiation and spaced from said first layer;
    partition means for separating the space between said layers into compartments;

at least one thermal radiation suppressor coating for absorbing and remitting thermal radiation and transmitting visible radiation; and a variable transparency thermal control device for controlling transmission of visible radiation as a function of temperature.

13. A transparent thermal insulating system having controllable transmissivity to visible radiation comprising:
a first layer transparent to visible radiation;
a second layer transparent to visible radiation and spaced from said first layer;
partition means for separating the space between said layers into compartments;
a thermal radiation suppressor device for suppressing thermal radiation transmission; and
a variable transparency thermal control device including a variable transmission layer whose opacity to visible radiation varies as a function of temperature.

14. A transparent thermal insulating member comprising:
a first layer transparent to visible radiation;
a second layer transparent to visible radiation and spaced from said first layer;
partition means transverse to and interconnecting said layers for separating the space between said layers into compartments, each said compartment including on its inner surface transverse to said layers a reflective material which reflects visible radiation and thermal radiation, and on its inner surface at each said layer a selective material which reflects thermal radiation and transmits visible radiation.

15. The thermal insulating member of claim 14 in which each of said compartments contains a vacuum.

16. A transparent thermal insulating member comprising:
a first layer transparent to visible radiation;
a second layer transparent to visible radiation and spaced from said first layer;
resilient partition means transverse to and interconnecting said layers for separating the space between said layers into first and second sets of compartments; said first set including on their inner surfaces a reflective material which reflects thermal radiation and visible radiation for blocking said radiation when said first set is expanded and transmitting said radiation when said second set is expanded.

* * * * *

UNITED STATES PATENT AND TRADEMARK OFFICE
CERTIFICATE OF CORRECTION

PATENT NO. : 3,953,110
DATED : April 27, 1976
INVENTOR(S) : Day Charoudi

It is certified that error appears in the above–identified patent and that said Letters Patent are hereby corrected as shown below:

Change the inventor's name from "Day Charoudi" to

-- Day Chahroudi --

[SEAL]

*Attest:*

Signed and Sealed this

Fourteenth Day of September 1976

RUTH C. MASON
*Attesting Officer*

C. MARSHALL DANN
*Commissioner of Patents and Trademarks*